(12) United States Patent
Collins et al.

(10) Patent No.: US 7,917,712 B2
(45) Date of Patent: Mar. 29, 2011

(54) METHOD AND SYSTEM FOR GOVERNING ACCESS TO STORAGE DEVICE ON SAN

(75) Inventors: Kevin Collins, Fort Collins, CO (US);
Jason A. Wildt, Fort Collins, CO (US);
Stephen Gold, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 275 days.

(21) Appl. No.: 11/240,120

(22) Filed: Sep. 30, 2005

(65) Prior Publication Data
US 2007/0079091 A1   Apr. 5, 2007

(51) Int. Cl.
*G06F 12/00* (2006.01)
(52) U.S. Cl. ........ 711/162; 711/112; 711/154; 711/170; 709/221; 709/222; 709/229
(58) Field of Classification Search ................... 711/162
See application file for complete search history.

(56) References Cited

U.S. PATENT DOCUMENTS

| | | | |
|---|---|---|---|
| 5,890,204 A | | 3/1999 | Ofer et al. |
| 5,951,686 A * | | 9/1999 | McLaughlin et al. ............ 713/2 |
| 6,295,575 B1 * | | 9/2001 | Blumenau et al. ................ 711/5 |
| 6,353,878 B1 | | 3/2002 | Dunham |
| 6,606,695 B2 * | | 8/2003 | Kamano et al. ............... 711/163 |
| 6,643,748 B1 * | | 11/2003 | Wieland ........................ 711/163 |
| 6,728,711 B2 | | 4/2004 | Richard |
| 6,728,848 B2 | | 4/2004 | Tamura et al. |
| 6,839,740 B1 * | | 1/2005 | Kiselev ......................... 709/214 |
| 6,907,532 B2 | | 6/2005 | Jari et al. |
| 6,968,434 B2 * | | 11/2005 | Kamano et al. ............... 711/163 |
| 7,194,538 B1 * | | 3/2007 | Rabe et al. .................... 709/224 |

| | | | |
|---|---|---|---|
| 2001/0047482 A1 | 11/2001 | Harris et al. | |
| 2002/0029319 A1 | 3/2002 | Robbins et al. | |
| 2002/0059317 A1 | 5/2002 | Black et al. | |
| 2002/0095593 A1 | 7/2002 | Daniell et al. | |
| 2002/0199073 A1 | 12/2002 | Tamura et al. | |
| 2003/0018813 A1 | 1/2003 | Antes et al. | |
| 2003/0023705 A1 * | 1/2003 | Kim ............................. 709/220 |

(Continued)

FOREIGN PATENT DOCUMENTS

EP   1 318 454   6/2003
WO   WO 01/82091 A1   11/2001

OTHER PUBLICATIONS

"Hitachi Freedom Storage," 2002, Hitachi, p. 19.* Chang-dong, Fu et al., Evaluation, Research and Development of Performance Benchmark on Network Storage System, Dept. of Computer Sci. & Technol., Tsinghua Univ., Beijing, China, Mini-Micro Systems, vol. 25, No. 12, pp. 2049-2054, Dec. 2004.

(Continued)

*Primary Examiner* — Kevin L Ellis
*Assistant Examiner* — Kalpit Parikh (57) ABSTRACT

The present invention in at least some embodiments relates to improved methods and systems for governing access to SAN data storage devices (or simply "SAN devices") employed in SAN systems. In some embodiments, the method involves storing a list at a SAN device. The list can be an exclusion list identifying devices that are not allowed to access the SAN device. During normal operation, the SAN device automatically contacts the SAN (or a component of the SAN, such as a SAN switch) to determine the identities of new devices that have entered into communication with the SAN. The SAN device then automatically updates the exclusion list to include those new devices such that, without further instructions, the SAN device is not accessible by those new devices. The method further can relate to the setup and failure recovery of SAN devices employed in SAN systems.

32 Claims, 3 Drawing Sheets

U.S. PATENT DOCUMENTS

| | | |
|---|---|---|
| 2003/0055932 A1* | 3/2003 | Brisse .......................... 709/223 |
| 2003/0208589 A1* | 11/2003 | Yamamoto .................... 709/224 |
| 2004/0010600 A1 | 1/2004 | Baldwin et al. |
| 2004/0083202 A1 | 4/2004 | Mu et al. |
| 2004/0177098 A1 | 9/2004 | Tamura et al. |
| 2004/0210656 A1 | 10/2004 | Beck et al. |
| 2004/0228290 A1 | 11/2004 | Graves |
| 2004/0243796 A1 | 12/2004 | Keohane et al. |
| 2004/0250156 A1 | 12/2004 | Weichselbaum |
| 2004/0267838 A1 | 12/2004 | Curran et al. |
| 2005/0071482 A1 | 3/2005 | Gopisetty et al. |
| 2005/0125556 A1 | 6/2005 | Curran et al. |

OTHER PUBLICATIONS

Shu, Jiwu et al., Design and Implementation of an San System Based on the Fiber Channel Protocol, Dept. of Computer Sci. & Technol., Tsinghua Univ., Beijing, China, IEEE Transactions on Computers, vol. 54, No. 4, pp. 439-448, Apr. 2005.

Garvey, M.J. Vendors Offer Storage Security, InformationWEEK, No. 1012, p. 75, Nov. 2004.

* cited by examiner

METHOD AND SYSTEM FOR GOVERNING ACCESS TO STORAGE DEVICE ON SAN

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to memory systems and, more particularly, to memory systems employing one or more storage area networks (SANs).

BACKGROUND OF THE INVENTION

It is often desirable that, at least in certain circumstances or at certain times, access to a given storage device coupled to a storage area network (SAN) be controlled, restricted or even entirely prevented. Allowing unintended access can be disadvantageous for a variety of reasons, including the reason that it might be inconsistent with maintaining desired levels of security or confidentiality. Yet even to the extent that some conventional SAN systems do provide some type of access control capability (many SAN systems entirely lack such a capability), such systems are still unsatisfactory. To begin with, such conventional SAN systems often are limited in their ability to control or restrict access to the storage devices on an ongoing basis after initial setup of the SAN system has occurred. Additionally, the setting up/configuration of such SAN systems tends to be complicated and to require significant time and effort on the part of technicians or other personnel. For example, in some cases, a manual intervention such as the switching of a physical switch by a human operation is necessary in order to allow a storage device to be accessed by other devices on the SAN. Also, some such conventional SAN systems tend to lack appropriate access control capabilities that are applicable in circumstances where a failure has occurred, e.g., a catastrophic failure associated with a power outage.

Therefore, for at least these reasons, it would be advantageous if improved methods of implementing/operating SAN systems (and corresponding improved SAN systems) could be developed. In particular, in at least some embodiments, it would be advantageous if SAN systems could be set up/configured so as to control or restrict the accessing of one or more storage devices on the SAN in an improved manner relative to conventional SAN systems. Additionally, in at least some embodiments, it would be advantageous if such access control capability could be provided on an ongoing basis even after installation of the storage devices with respect to the SAN had occurred, so as to allow for repeated modifications to any access restrictions. Further, in at least some embodiments, it would be advantageous if (notwithstanding the existence of such an access control capability), the SAN systems nevertheless could be set up and configured (and reconfigured) in a relatively easy manner, without a need for excessive effort on the part of technicians or other personnel in the form of manual intervention or otherwise. Additionally, in at least some embodiments, it would be advantageous if such SAN systems, upon the occurrence of failures, could be relatively easily reinstalled in a manner that largely or entirely maintained desired restrictions on access that existed prior to the failures.

BRIEF SUMMARY OF THE INVENTION

In at least some embodiments, the present invention relates to a method of governing access to a storage device connected to a storage area network (SAN). The method includes obtaining a first list, where access to the storage device by other devices is governed at least in part based upon the first list, and where each of the other devices is at least one of fully precluded from accessing the storage device, partly precluded from accessing the storage device, and allowed to access the storage device. The method additionally includes querying the SAN to determine if at least one additional other device has entered into communication with the SAN, and automatically updating the first list to reflect the at least one additional other device so that access to the storage device by the at least one additional other device is also governed at least in part based upon the first list.

DETAILED DESCRIPTION OF THE PREFERRED EMBODIMENT

Storage area networks (SANs) are networks that allow for the linking of multiple computer storage or memory devices with other devices such as computers (e.g., server computers). SANs in particular are useful for allowing numerous discrete data storage devices to be coupled for communication with, and to be accessed by, one or more other devices as if those numerous discrete storage devices were directly connected with the other devices requesting access (or even possibly as if those numerous discrete storage devices were a single integrated storage device).

Figure 1:
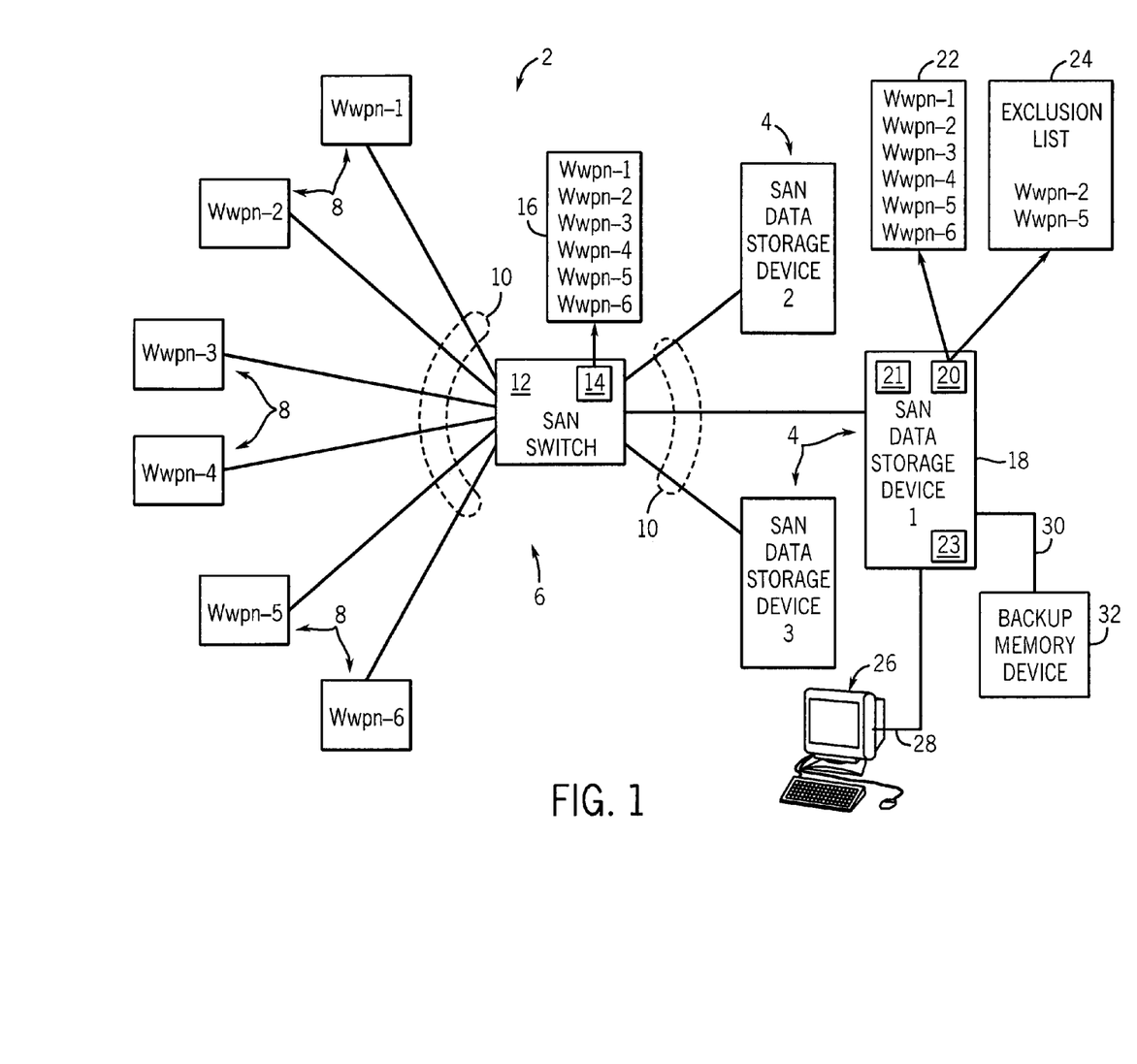
FIG. 1 is a schematic diagram showing an improved SAN system in accordance with one exemplary embodiment of the present invention.

Referring to FIG. 1, an exemplary SAN system 2 in accordance with one exemplary embodiment of the present invention includes SAN data storage devices 4 that are coupled by way of a SAN 6 to other devices 8. In the present embodiment, the SAN 6 includes multiple communication links 10 and a SAN switch 12. Each of the communication links 10 connects one (or, in alternative embodiments, more than one) of the SAN data storage devices 4 or the other devices 8 with the SAN switch 12. Although in the present embodiment, the SAN 6 includes the communication links 10 and the SAN switch 12, in alternate embodiments the SAN 6 could also take on other forms or have other structures than those shown.

Each of the SAN data storage devices 4 is intended to be representative of any of a number of different types of storage devices, for example, disk storage devices such as hard disk drives or CD-ROM devices, tape data storage devices (e.g., tape libraries), virtual tape libraries (which are disk-based libraries) and a variety of other storage devices. The other devices 8 are intended to be representative of any of a variety of different types of devices that can be coupled to a SAN such as the SAN 6, so as to access information stored at one or more of the storage devices 4. For example, one or more of the other devices 8 could be computers (e.g., server computers) or other controllers, operator interface terminals such as workstations, or even additional data storage devices that are attempting to access one or more of the data storage devices 4.

The SAN 6 is capable of operating in a manner that allows the multiple data storage devices 4 to be accessed by the other devices 8 in a seamless or almost seamless manner such that the data storage devices 4 largely can be viewed as being directly accessible or directly connected to each of the other devices 8 (also, in some cases, the SAN 6 makes it appear that the data storage devices 4 are acting as a single data storage device). Although three data storage devices 4 are shown in FIG. 1, the SAN system 2 is intended to be representative of a variety of SAN systems that include any number of data storage devices ranging from only one data storage device to many more than three data storage devices. Likewise, the SAN system 2 is intended to be representative of a variety of SAN systems that include any one or more other devices that are attempting to access information stored at one or more storage devices that are connected to the SAN.

As shown, in the present embodiment the SAN switch 12 keeps track of the SAN data storage devices 4 and other devices 8 that are connected to the SAN 6. In particular, the SAN switch 12 includes a memory device (or memory devices) 14 that stores a list 16 of all of the other devices 8 that are in communication with the SAN 6. Thus, in the present embodiment, the list 16 includes six names (or "unique identifiers") corresponding to the six other devices 8 (namely, Wwpn-1 . . . Wwpn-6). The SAN switch 12 updates the list 16 as the identities and number of the other devices 8 varies over time. This function of the SAN switch 12 of keeping track of the devices attached to the SAN 6 in some embodiments can be termed a Simplified Naming Service (SNS).

In accordance with the present embodiment of the invention, a first of the SAN data storage devices 4, namely the SAN data storage device 18, also includes one or more memory devices 20. In the present embodiment, the memory device(s) 20 are separate from a primary data storage medium (or media) 21 of the SAN data storage device 18 that provides the primary data storage capacity of the data storage device albeit, in other embodiments, the memory device(s) 20 can form merely a portion of the primary data storage medium 21 (or both the memory device and medium 21 can form sub-portions of a single memory device). In some embodiments, the memory device(s) 20 are one or more caches associated with the storage device 18.

Further as shown, the storage device 18 includes a control device 23, which can be, for example, a microprocessor, a computer, a programmable logic controller, or other control device. The control device 23 is coupled to each of the memory device(s) 20 and the primary data storage medium 21 by one or more control lines. As described in further detail below, the control device 23 governs, based at least in part upon the contents of the memory device(s) 20, whether the storage device 18 will provide data from the primary data storage medium 21 onto the SAN 6 in response to requests received from the other devices 8 via the SAN. Although the present discussion focuses upon the operation of the first SAN data storage device 18 as an example, it should be understood that each of the other data storage devices 4 also can employ one or more memory device(s) such as the memory device 20 as well as primary data storage media 21 and control device 23, and operate in the same (or largely the same) manner as the data storage device 18.

As shown, the memory device 20 of the first SAN data storage device 18 stores information relating to the identities and number of the other devices 8. In particular, the memory device 20 stores a first list 22 of all of the other devices 8. The list 22 is intended to be identical to the list 16 stored on the SAN switch 12, albeit in the present embodiment the storage device 18 only queries the SAN switch 12 on a periodic basis, such that in certain cases when one or more of the other devices 8 are removed from the SAN 6 or new such devices are coupled to the SAN, the list 16 is updated but the list 22 is not yet updated until a later time.

In addition to the list 22, the memory device 20 also stores a second list 24 that in the present embodiment is an exclusion list. The exclusion list 24 lists one or more of the other devices 8 (or, in certain cases, does not list any of the other devices, at least at certain times) that are to be prevented from accessing the first SAN data storage device 18. As indicated by the exemplary exclusion list 24 shown in FIG. 1, the exclusion list often lists a subset (e.g., two out of the six) of the other devices 8. In the present embodiment, the contents of the exclusion list 24 are initially set (typically when the first SAN data storage device 18 is first coupled to the SAN 6) by a technician or other human operator by way of a user interface 26 that is coupled to the storage device 18 by way of a communication link 28.

Although the user interface 26 can be employed to initially set the contents of the exclusion list 24, in the present embodiment the contents of the exclusion list 24 can also be updated or changed on a periodic, continuous or other basis in response to further commands or information provided via the user interface 26. That is, a human operator by way of the user interface 26 can change, at any time, the set of other devices 8 that are precluded from accessing the data storage device 18. The setting, updating, or modifying of the contents of the lists 22, 24 is discussed in further detail with reference to FIGS. 2, 3A and 3B.

The user interface 26 can take a variety of forms depending upon the embodiment. For example, the user interface 26 can be a standard "Wintel" computer having input and output devices such as a monitor, keyboard, mouse or other devices (e.g., a touch screen). The user interface 26 can also include, for example, a graphical user interface (GUI) or a command line interface. The communication link 28 can take a variety of forms including, for example, a dedicated wire line and a wireless connection. In some embodiments, the user interface also can be replaced with some other control device (e.g., one not requiring human interaction). For example, in some embodiments, the initial specifying of the exclusion list is determined automatically, without any immediate human involvement, while changes to the exclusion occur at least sometimes in response to commands provided via the user interface 26.

As described in further detail with reference to FIGS. 3A and 3B, in at least some embodiments including the present embodiment, the first SAN data storage device 18 also is coupled by way of a communication link 30 to a backup memory device 32, which stores (depending upon the embodiment) one or both of the lists 22, 24. The backup memory device 32 and communication link 30 can include any of a variety of different structures. For example, the backup memory device 32 could be one of the other devices 8 such as a SAN based disk, a dedicated additional storage device, a LAN-based storage location, or any of a variety of other memory/storage devices located locally or remotely with respect to the storage device 18. Also for example, the communication link 30 (like the link 28) can be a dedicated wire link that hardwires the backup memory device 32 to the first SAN data storage device 18, or a wireless connection.

Although not shown in FIG. 1, in alternate embodiments it is possible that the storage device 18 can be in communication, directly or indirectly, with one or more informational devices other than the SAN switch 12 (or other portion of the SAN 6) in order to obtain information (e.g., attributes) regarding the storage devices 4 and other devices 8 that are connected to or in communication with the SAN. Such an informational device can, but need not, be termed a "repository" of information regarding the devices that are connected to the SAN. Depending upon the embodiment, such an informational device could take any of a variety of different forms, could be coupled to the storage device 18 in any of a variety of different manners, and could be (but need not be) directly coupled to the SAN 6 itself. For example, such a repository could include one of the other devices 8, the user interface 26, or a remote device. Also, such a repository could be coupled to the storage device 18 directly or indirectly by way of a LAN, a communication link operating in accordance with the Storage Management Initiative Specification (SMIS), or other communication link(s) including possibly the SAN itself.

Depending upon the embodiment or configuration, the information supplied by a repository could be used in a variety of ways. For example, the information supplied by a repository could serve as a basis for making determinations regarding the granting of security access. Further for example, in certain circumstances, the information supplied by a repository could allow for making access decisions at a finer granularity (e.g., allowing for different levels of access or varying access decisions based upon a variety of different considerations) than would otherwise be the case. In some circumstances, access decisions could be based upon policies combining one or more of the attributes (or other information) retrieved from a repository.

Figure 2:
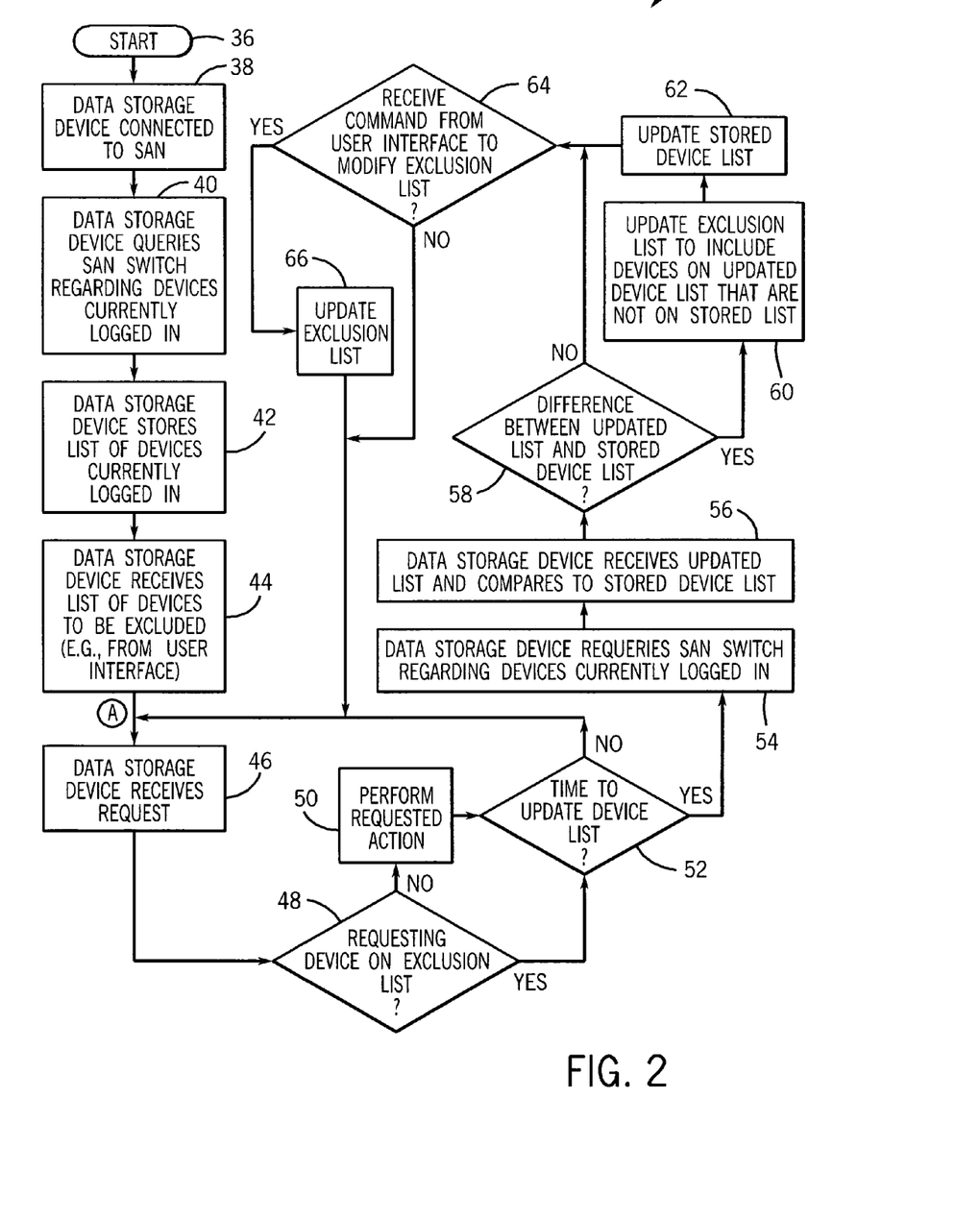
FIG. 2 is a flowchart showing exemplary steps of a method of operating the SAN system of FIG. 1 in such a manner so as to achieve desired restrictions on the accessing of a given data storage device of the SAN system, in accordance with certain embodiments of the present invention.

Turning to FIG. 2, a flowchart 34 shows exemplary steps of operation of the SAN system 2 of FIG. 1 in accordance with at least some embodiments of the present invention. In particular, steps of operation relating to the initial setting up of the first SAN data storage device 18 in relation to the rest of the SAN system 2, and then continued operation of the SAN system thereafter, are shown. As shown, upon starting at a step 36, at a step 38 the first SAN data storage device 18 is connected to the SAN 6. At a step 40, the storage device 18 queries the SAN switch 12 as to the devices (specifically, the other devices 8) that are currently logged in with respect to the SAN 6, that is, the devices identified in the list 16 stored on the SAN switch 12.

Next, at a step 42, the storage device 18 stores in its own memory device 20 the first list 22 of devices that are currently logged in. The first list 22 stored on the memory device 20 is identical to that the list 16 currently existing on the SAN switch 12. Further, at a step 44, the storage device 18 then receives additional information regarding a list of devices to be excluded in terms of being able to access the storage device 18. As discussed above with respect to FIG. 1, this exclusion list 24 can be provided from any of a variety of sources and, in the present embodiment, is provided by a technician or other operator via the user interface 26.

Upon the execution of step 44, the initialization or setup procedure in terms of connecting the storage device 18 to the SAN 6 and configuring the storage device for operation is completed. Once the storage device 18 is initialized and operational, the storage device is then capable of receiving requests via the SAN 6 from one or more of the other devices 8. Thus, at a step 46, the storage device 18 receives a request in which one of the other devices 8 is attempting to access the storage device to obtain a portion of data stored within that device (e.g., stored within the primary data storage medium 21). Upon receiving such a request, the storage device 18 consults the exclusion list 24 stored on its memory device 20 at a step 48 to determine whether the other device 8 making the request is on the exclusion list.

If the requesting device is not on the exclusion list 24, then the storage device 18 performs the requested action at a step 50, that is, the storage device provides the requested data to the requesting device over the SAN 6. Upon completing the requested action at step 50, the storage device 18 considers whether it is time to update the list 22 regarding devices on the SAN at a step 52. If the storage device 18 at step 48 determines that the requesting device is on the exclusion list 24, then the storage device declines to perform the requested action and immediately proceeds from step 48 to step 52.

Assuming that, at step 52, it is not yet time to update the list 22, then the storage device 18 again is available to receive additional requests and returns to step 46. If, however, at step 52 it is determined that it is time to update the list 22 of devices on the SAN 6, the storage device 18 requeries the SAN switch 12 at a step 54 regarding the other devices 8 that are currently logged in with respect to the SAN 6. Whether it is time to update the list 22 can be determined in a variety of ways, for example, simply based upon whether a certain amount of time (e.g., several hundred milliseconds) has elapsed since the previous updating of the list.

Upon requerying the SAN switch 12, at a step 56 the storage device 18 receives a current (or updated) device list corresponding to the list 16 on the SAN switch 12 and compares the received current device list to the existing version of the list 22 stored on the memory device 20. If at a step 58 it is determined that there exists some difference between the current device list received from the SAN switch 12 and the list 22 stored on the memory device 20, then the storage device 18 proceeds to update the exclusion list 24 to include any devices on the received current device list that are not on the list 22 stored on the memory device 20.

Thus, if any additional other devices 8 have been added to the SAN system 2 since the previous time at which the SAN switch 12 was consulted regarding the identities of the other devices 8, the identifiers/names of those newly-added devices are automatically added to the exclusion list 24. Likewise, if one or more of the other devices 8 no longer are connected to the SAN 6, the exclusion list 24 also is updated to remove the identifiers/names of those devices that have been removed.

Upon such adjustment of the exclusion list 24, the storage device 18 at a step 62 also updates the list 22 to reflect the current devices that are on the SAN 6 in accordance with the newly-received information from the SAN switch 12, and then proceeds to step 64. Also, if at step 58 it is determined that there does not exist any difference between the current list of devices received from the SAN switch 12 and the list 22 of devices stored on the memory device 20, then the storage device 18 merely proceeds to step 64 without performing any updating of the exclusion list 24 or the list 22 of devices.

Upon reaching step 64, the storage device 18 also determines whether any command has been provided from another source (e.g., from the user interface 26) to otherwise modify the exclusion list 24 (or even possibly the list 22 of devices). If such a command is provided, then the exclusion list 24 is updated accordingly at a step 66 while, if not, no update occurs. In either case, the storage device 18 then returns to step 46 to receive additional requests.

Through operation of the process shown in FIG. 2, access to the storage device 18 (or any of the storage devices 4) can be governed on an ongoing basis. Due to the periodic requerying of the SAN switch 12 by the storage device 18, changes in the identities and number of devices connected to the SAN 6 are automatically identified, allowing for automatic updating of the exclusion list 24, such that the addition of new devices onto the SAN does not result in unintended accessing of the storage device by those new devices. At the same time, the governing of access to the storage device 18, as well as the updating of the exclusion list 24, can be accomplished in a manner requiring only limited amounts of operator attention. Initial setup, as well as continued control over the operation of the storage device 18 in connection with the SAN 6 can be achieved with relative ease and at low cost.

Figures 3A, 3B:
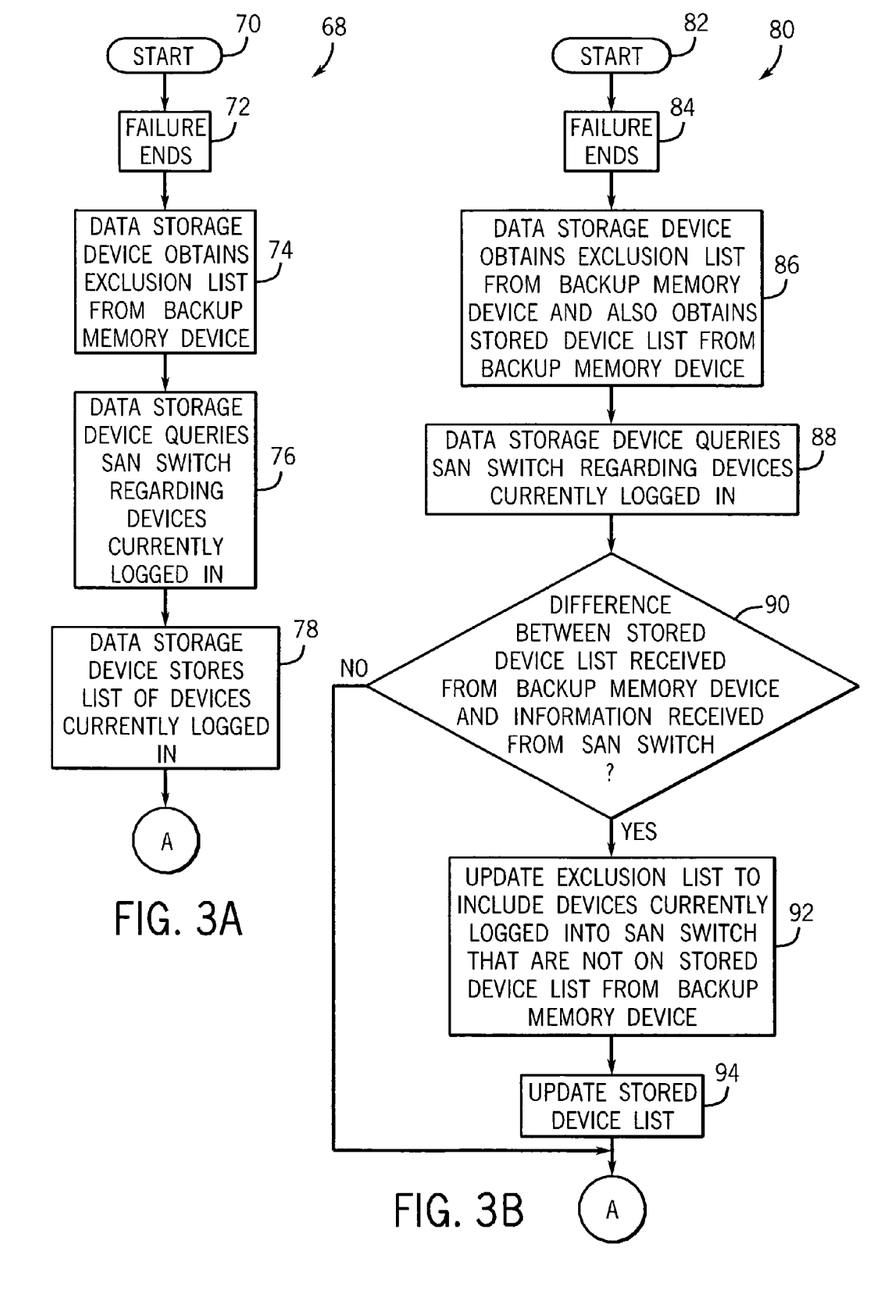
FIGS. 3A and 3B are additional flowcharts showing exemplary steps of operation of the SAN system of FIG. 1 relating to recovery of the SAN system subsequent to the occurrence of a failure, in accordance with certain embodiments of the present invention.

Turning to FIGS. 3A and 3B, in accordance with at least some embodiments of the present invention, the operation of the storage device 18 in relation to other components of the SAN system 2 can take one of two forms after a failure has occurred such that one or both of the lists 22, 24 of the memory device 20 have been lost (e.g., due to a power outage or the like). FIG. 3A shows a first flowchart 68 in which the storage device 18 is reinitialized by consulting the backup memory device 32 to obtain exclusion list information (e.g., information corresponding to the list 24) that was stored in the backup memory device, while FIG. 3B shows a second flowchart 80 in which the storage device 18 is reinitialized based upon both exclusion list information and device list information (e.g., information corresponding to the list 22) obtained from the backup memory device 32. Regardless of whether the steps shown in FIG. 3A or FIG. 3B are followed, upon performing such recovery steps, the storage device 18/SAN system 2 returns to a point A shown in FIG. 2, that is, to step 46 at which the storage device is then in a position to receive requests from the other devices 8 on the SAN 6.

Turning to FIG. 3A in particular, upon starting at a step 70, it is first determined that a failure (e.g., a power outage) has ended at a step 72. Then, at a step 74, the storage device 18 obtains stored exclusion list information from the backup memory device 32 and stores the information in the memory device 20 as the exclusion list 24. Upon the restoring of the exclusion list information within the memory device 20, at a step 76 the storage device 18 queries the SAN switch 12 regarding the devices that are currently logged in with respect to the SAN 6. Finally, the storage device 18 at a step 78 stores the list of devices currently logged in as provided by the SAN switch 12, after which the storage device 18 then returns to point A.

In contrast, with respect to FIG. 3B, upon starting at a step 82, and further upon determining that the failure has ended at a step 84, the storage device 18 then obtains both stored device list information and exclusion list information from the backup memory device 32 and based upon that information restores the first and second lists 22,24, at a step 86. Then, at a step 88, the storage device 18 queries the SAN switch 12 regarding the devices that are currently logged in with respect to the SAN 6. At a step 90, the storage device 18 then determines whether there is any difference between the stored device list information received from the backup memory device 32 and the information received from the SAN switch 12.

If there is such a difference, the exclusion list 24 is updated, at a step 92, to include any devices that are currently logged in with respect to the SAN 6 that were not included in the stored device list information that was obtained form the backup memory device 32. At a step 94, the list 22 of the storage device 18 is then updated to reflect the current information received from the SAN switch 12, after which the process is at point A. However, if at step 90 it is determined that there is no difference between the stored device list information received from the backup memory device 32 and the current information received from the SAN switch 12, then the storage device 18 proceeds from step 90 directly to point A.

Regardless of whether the flowchart 68 or the flowchart 80 is followed by the storage device 18/SAN system 2, the result of the process is largely the same insofar as, after the failure, the storage device 18 is configured so that all of the devices that were precluded from accessing the storage device prior to the failure presumptively remain excluded. However, in the case of FIG. 3A, there is no adjustment to the exclusion list made to reflect any changes in the devices that are coupled to the SAN 6 that may have occurred between the time of the failure and the time of the recovery. In contrast, with respect to FIG. 3B, any other devices that are newly added during the failure are automatically added to the exclusion list. It should also be noted that, in either case, an operator still has the option of further adjusting the exclusion list notwithstanding these automatic operations (e.g., in accordance with steps 64 and 66 of FIG. 2).

In at least some embodiments, the presently-described processes (or variations thereof) also can be used to allow a user to completely delete a current snapshot of the SAN environment and then to respecify those devices that are connected to the SAN 6, for example, by requerying the SAN switch 12 for the new current set of devices logged into the SAN. At the same time, the exclusion list could be completely changed/overwritten so as to not include any of the devices logged into the SAN 6. As a result, in at least some embodiments of the present invention, a methodology of quickly granting access to large numbers of newly added devices on the SAN 6 is achieved.

Although the above discussion concerning FIGS. 1, 2, 3A and 3B describe certain embodiments of the present invention, it should be understood that numerous variations to the system and processes described above are also intended to be encompassed within the present invention. For example, in certain embodiments, rather than (or in addition to) the exclusion list 24, the storage device 18 can instead (or also) store a granted list identifying those of the other devices 8 that are allowed to access the storage device. In a system employing only a granted list (as opposed to an exclusion list), only those devices that were on the granted list would be allowed to gain access to the storage device, and any devices not on the granted list would be denied access.

Also for example, while the above discussion concerning the FIGS. particularly focuses upon the obtaining/retrieving of information from the SAN 6 (e.g., the SAN switch 12), the backup memory device 32, and/or the user interface 26, in alternate embodiments information could instead or additionally be obtained from one or more alternate devises or "repositories" such as those discussed above. That is, one or more "repositories" or similar devices could serve as sources of information regarding the names/identities/attributes of devices on the SAN as well as other lists such as exclusion lists. Through the use of such information (e.g., attributes) received from such repositories, it would be possible to determine a variety of levels of access, or otherwise to make decisions on allowing access based upon a variety of considerations.

Additionally, while certain embodiments employ exclusion and/or granted lists, additional embodiments could employ multiple lists (or arrays or other organized information, all of which can be generally understood to constitute "lists" in a general sense) identifying devices having varying degrees or levels of access. For example, the storage device 18 could have (instead of or in addition to an exclusion list and/or a granted list) a "partial granted" list that would identify devices that could access the storage device only under certain circumstances. Also for example, the storage device 18 could have multiple lists including multiple partial exclusion or partial granted lists, each of which identified devices that could not or could access the storage device (or portions of the storage device) under various circumstances or at various times. Further, although in the present embodiment the SAN 6 is described as including the SAN switch 12 that keeps track of the devices that are logged onto the SAN, in alternate embodiments another manner of keeping track of the devices connected to the SAN could be employed.

As discussed, various embodiments of the present invention are capable of providing (depending upon the embodiment) one or more advantages in comparison with many conventional systems. For example, certain embodiments of the present invention allow for relatively easy initialization of SAN data storage devices onto a SAN system. Additionally, certain embodiments of the present invention allow for significant control to be exercised over which devices can access the SAN data storage devices, with such control being variable over time, on an ongoing basis. Further, not only can such control over access be varied over time due to automatic updating of the information stored on the storage device, but also such control can be governed by user commands (or commands received from other sources, such as other computers).

Such access control, as can be provided by various embodiments of the present invention, can be helpful in a variety of circumstances. For example, the particular information stored on a given storage device in some circumstances is confidential or appropriate only for certain parties having a security clearance, and in such circumstances it therefore can be desirable to restrict access to the given storage device. Also, it can be desirable to create/modify access restrictions when changes occur to a SAN system, for example, when new devices are added to the system. Additionally, in at least some embodiments of the present invention, recovery from failures (even catastrophic failures or disasters) can be achieved with relatively little effort, and in a manner that maintains much if not all control over access to the SAN data storage device.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of governing access to a storage device connected to a storage area network (SAN), the method comprising:
    at initial setting up of the storage device in relation to a rest of the SAN;
        obtaining a first list at the storage device from a SAN repository having stored thereon the first list, repository, wherein access to the storage device by other devices is governed at least in part at the storage device based upon the first list, and wherein each of the other devices is at least one of fully precluded from accessing the storage device, partly precluded from accessing the storage device, and allowed to access the storage device; and
    during operation of the SAN:
        checking the first list for a requesting device and performing a requested action if the requesting device is not at least partly precluded from accessing the storage device;
        if it is time to update the first list after checking the first list and performing the requested action, then querying the SAN to determine if at least one additional other device has entered into communication with the SAN; and
        automatically updating the first list to reflect the at least one additional other device so that access to the storage device by the at least one additional other device is also governed at least in part based upon the first list.

2. The method of claim 1, further comprising:
    querying the SAN to obtain a second list of the other devices that are in communication with the SAN, prior to the querying of the SAN to determine if the at least one additional other device has entered into communication with the SAN.

3. The method of claim 2, further comprising:
    storing the second list, wherein the second list is stored in at least one of a first memory device associated with the storage device and a backup memory device.

4. The method of claim 2, wherein the second list is updated to reflect information received based upon the querying of the SAN to determine if the at least one additional other device has entered into communication with the SAN.

5. The method of claim 4, wherein the querying of the SAN is repeated on at least one of a substantially periodic basis and a substantially continuous basis, such that the second list is updated on at least one of a substantially periodic basis and a substantially continuous basis.

6. The method of claim 1, wherein the first list is an exclusion list, and the storage device is configured to fully preclude at least one of the other devices that are identified on the exclusion list from accessing the storage device.

7. The method of claim 6, wherein the automatic updating of the first list results in the exclusion list being updated to reflect the at least one additional other device and wherein, subsequent to the updating of the first list, the storage device fully precludes the at least one additional other device from accessing the storage device.

8. The method of claim 1, wherein the first list is a granted list, and the storage device is configured to allow the other devices identified on the granted list to access the storage device.

9. The method of claim 1, wherein the querying of the SAN involves contacting a SAN switch that has available information regarding the other devices that are in communication with the SAN.

10. The method of claim 1, wherein the first list is at least one of obtained from, and modified based upon, at least one input signal received from a user interface.

11. The method of claim 1, further comprising:
    storing the first list on a backup memory device; and
    after an occurrence of an event, recovering the first list from the backup memory device.

12. The method of claim 11, wherein the storage device precludes the other devices listed on the recovered first list from accessing the storage device.

13. The method of claim 11, further comprising:
    storing a second list on the backup memory device;
    after the occurrence of the event, recovering the second list from the backup memory device; querying the SAN to obtain information regarding the other devices that are currently in communication with the SAN;
    comparing the recovered second list with the obtained information; and
    updating the second list to include any of the other devices that are currently in communication with the SAN that are not on the recovered second list.

14. The method of claim 11, wherein the event is a failure causing a loss of at least a portion of information that was stored on the storage device prior to the event.

15. The method of claim 1,
wherein the storage device includes at least one of a hard disk drive, a tape data storage device, a CD-ROM device, an electronic memory device, and another memory device, and
wherein the other devices include at least one of a computer, a workstation, a controller, and a data storage device.

16. The method of claim 1, wherein at least one of the first list, at least one attribute, and other information is at least one of obtained from and stored in an additional repository.

17. A method of governing access to a storage device connected to a storage area network (SAN) that is in communication with a plurality of other devices, the method comprising:
storing, on a first backup memory device, a first list stored on a SAN switch received at the storage device from the SAN switch, the first list regarding at least one of the other devices that is in communication with the SAN;
recovering and storing the first list at the storage device after a failure has occurred;
based upon the recovered first list, determining whether the at least one other device is at least one of precluded from accessing the storage device, partly allowed to access the storage device, and fully allowed to access the storage device, and only updating the recovered first list if it is time to update the recovered first list;
storing, on at least one of the first backup memory device and a second backup memory device, a second list of each of the other devices that are in communication with the SAN; recovering the second list after the failure has occurred;
comparing the recovered second list with further information obtained from the SAN after the failure has occurred; and
determining based upon the comparison whether the other devices in communication with the SAN have changed between a first time prior to the failure and a second time after the failure.

18. The method of claim 17, wherein the first list is at least one of an exclusion list and a granted list.

19. The method of claim 17, further comprising:
updating the first list to include at least one newly-added device, if it is determined based upon the comparison that the other devices in communication with the SAN have changed between the first and second times so as to include the at least one newly-added device.

20. A data storage device for implementation in connection with a storage area network (SAN) that is also in communication with a plurality of other devices, the data storage device comprising:
first means for storing data that is capable of being provided onto the SAN;
second means for storing a first list of at least one of the other devices that is in communication with the SAN, wherein the first means and second means are respective subportions of a single memory device, wherein the first list is received form a SAN switch having stored thereon the first list; and
a control device in communication with each of the first means and the second means, wherein the control device determines whether at least a portion of the data stored by the first means can be accessed by the at least one other device based at least in part upon the first list stored at the second means of the data storage device, wherein the first list is automatically updated to reflect the at least one of the other devices and wherein, subsequent to the automatic updating of the first list, the storage device fully precludes the at least one of the other devices from accessing the storage device.

21. The data storage device of claim 20, wherein the second means also stores a second list of the plurality of other devices, wherein the data storage device is configured to automatically and repeatedly query the SAN to identify changes in the plurality of other devices and, when the changes are identified, to automatically update each of the first and second lists.

22. A SAN system comprising the data storage device, the SAN, and the plurality of other devices of claim 20, the SAN system further comprising:
a user interface coupled to at least one of the data storage device and the SAN, wherein at least one of the first list and a second list are determined based at least in part upon an exclusion list provided by a user.

23. The SAN system of claim 22, further comprising:
a backup memory device coupled at least indirectly to the data storage device, wherein at least one of the first list and the second list are stored on the backup memory device.

24. A data storage device for implementation in connection with a storage area network (SAN) that is also in communication with a plurality of other devices, the data storage device comprising:
a primary memory component, wherein data that is capable of being provided onto the SAN is stored in the primary memory component;
a second memory component, wherein information regarding at least one of the other devices that is in communication with the SAN is stored in the second memory component, wherein the data and the information are both received at the data storage device from a SAN switch and the information is checked when it is time to update the information; and
a controller that is in communication with each of the first and second memory components,
wherein a decision made by the controller regarding whether the primary memory component can be accessed by the other devices depends at least in part upon the information stored in the second memory component of the data storage device; wherein the information is received from a SAN switch having stored thereon the information.

25. The data storage device of claim 24, wherein the information includes at least one of an exclusion list, a granted list, a partial granted list, a set of characteristics, a set of attributes, a set of policies, and an array.

26. The data storage device of claim 24, wherein each of the first and second components is a cache, a hard disk drive, a tape data storage device, a CD-ROM device, an electronic memory device, and another memory device.

27. The data storage device of claim 24, wherein the information is obtained from at least one of a user interface, one of the other devices on the SAN, a SAN switch, and a repository.

28. The data storage device of claim 27, wherein the first and second memory components are portions of a single memory device, and wherein the data storage device further includes a communication link by which the data storage device can communicate with the user interface.

29. The data storage device of claim 24, further comprising a backup memory device that stores both a first list and a second list.

30. A non-transitory computer-readable medium embodying instructions for a processor to perform a method of managing a data storage device to operate in connection with a storage area network (SAN) that is also in communication with a plurality of other devices, the method comprising:
- initially obtaining a first set of information at the data storage device from a SAN switch having stored thereon the first set of information, wherein access to the storage device by the other devices is governed at least in part based on the first set;
- causing the data storage device to query the SAN to determine if at least one additional other device has entered into communication with the SAN; and
- automatically updating the first set to reflect the at least one additional other device so that access to the storage device by the at least one additional other device is also governed at least in part based upon the first set, wherein the automatic updating of the first set results in an exclusion list being updated to reflect the at least one additional other device and wherein, subsequent to the updating of the first set, the storage device fully precludes the at least one additional other device from accessing the storage device; and
- a communication link for use in communicating information with a user interface, a backup memory device, and a non-SAN communication link for communicating with a repository that is not in communication with the SAN.

31. The non-transitory computer readable medium of claim 30, wherein the method to be performed by the processor further includes at least one of:
- communicating with an external device to obtain at least one of the first set and a second set; and
- receiving a backup copy of the first set from a backup memory device subsequent to an occurrence of a failure.

32. The non-transitory computer readable medium of claim 30, wherein the method to be performed by the processor further includes:
- determining based upon the first set that at least some data from the data storage device can be provided onto the SAN in response to an access request received off of the SAN from at least one of the other devices; and
- causing a communication of the at least some data onto the SAN.

* * * * *

UNITED STATES PATENT AND TRADEMARK OFFICE
CERTIFICATE OF CORRECTION

| | | |
|---|---|---|
| PATENT NO. | : 7,917,712 B2 | Page 1 of 1 |
| APPLICATION NO. | : 11/240120 | |
| DATED | : March 29, 2011 | |
| INVENTOR(S) | : Kevin Collins et al. | |

It is certified that error appears in the above-identified patent and that said Letters Patent is hereby corrected as shown below:

In column 9, line 51, in Claim 1, delete "SAN;" and insert -- SAN: --, therefor.

In column 9, lines 53-54, in Claim 1, after "list," delete "repository,".

In column 11, line 61, in Claim 20, delete "form" and insert -- from --, therefor.

Signed and Sealed this

Sixth Day of September, 2011

David J. Kappos
*Director of the United States Patent and Trademark Office*